United States Patent Office 3,356,930
Patented Dec. 5, 1967

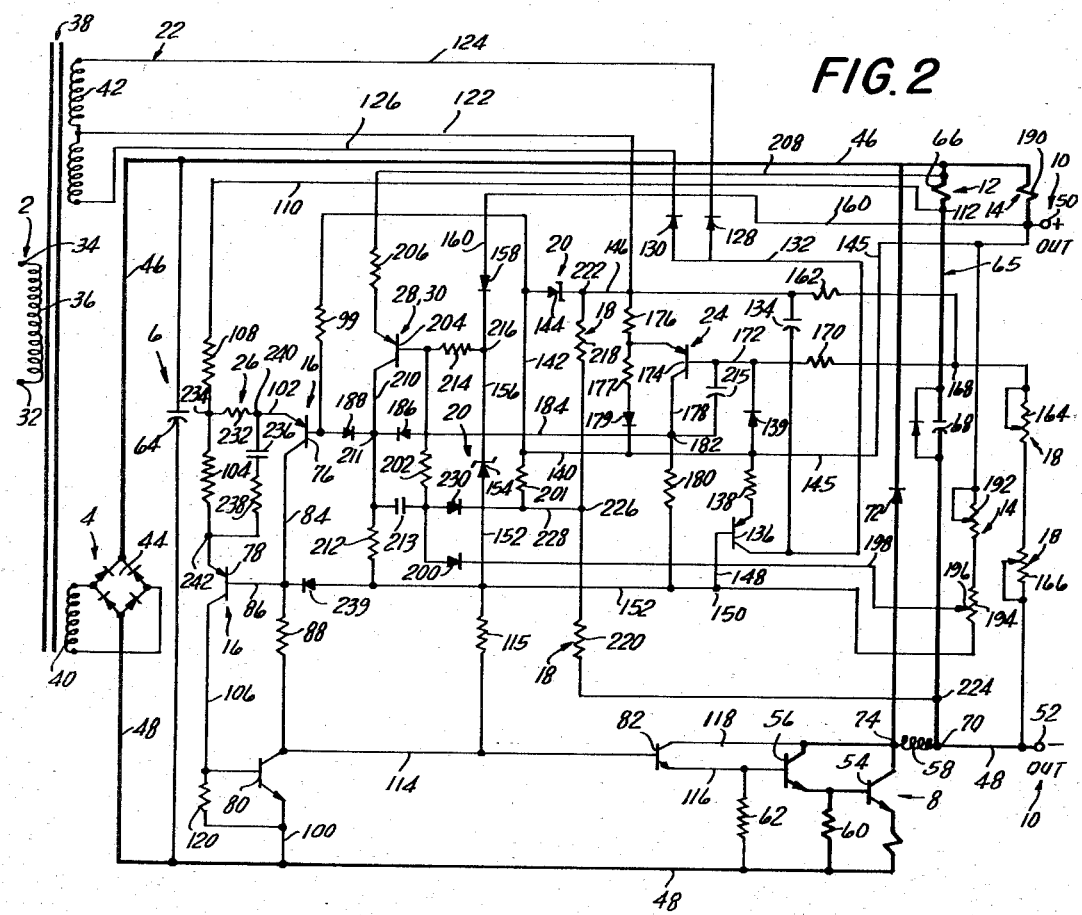

3,356,930
FLIP-FLIP CONTROLLED SWITCHING REGULATOR WITH VOLTAGE, CURRENT AND POWER LIMITING FEATURES AND WITH FILTER CIRCUIT LOAD CHANGE SENSOR
Peter J. Lupoli, Hamden, and Johannes Schaefer, Wilton, Conn., assignors to Technipower Incorporated, South Norwalk, Conn., a corporation of Connecticut
Filed Apr. 2, 1965, Ser. No. 445,056
27 Claims. (Cl. 323—20)

ABSTRACT OF THE DISCLOSURE

A switching type regulator in which the on and off times are controlled by a flip-flop circuit which is in turn controlled by a voltage sensing circuit to provide voltage regulation, a current sensing circuit to provide current limiting, and a combination of another voltage sensing circuit and said current sensing circuit to provide a power limiting feature, a filter circuit being connected across the output and the control of the flip-flop circuit being modified in accordance with the current flowing in said filter circuit in order to increase the speed of response of the system.

---

The present invention relates to an improved power supply system regulated by a transistor or the like which is operated in a switching mode, and in particular to such a system providing for regulation of the output primarily to maintain a substantially constant output voltage, but with output current limiting and output power limiting features, with extremely rapid response to load changes, and with means for eliminating the effect of overly rapid non-major fluctuations in the output voltage, all to the end of providing a regulating system the operating characteristics of which are exceptionally superior.

The use of switching regulators, and particularly transistorized switching regulators, whether applied to a built-in power supply or adapted to be connected to an existing external power supply, is becoming more and more prevalent. The main recognized advantage of the switching-type regulator, as compared to that type of regulation system which utilizes a continuously variable impedance, is that relatively low power is dissipated in the regulating unit, consequently permitting the full current capabilities of that unit to be used with only minor consideration required for its thermal or heat-resistance characteristics. This is a particularly important feature when transistors are used, since the power-handling characteristics of such transistors is definitely limited by the amount of heat produced in them under operating conditions. Switching-type regulator systems have, however, generally been considered not as accurate as the more conventional continuously variable impedance type of systems.

It is the prime object of the present invention to devise a switching-type regulator system which maintains the characteristic power-handling and low-loss capabilities of switching systems, but which greatly improves the accuracy and speed of regulation achievable, thereby rendering the switching system comparable in accuracy to regulator systems of the continuously variable impedance type.

It is a further prime object of the present invention to devise such a system with additional control features, such as (1) means to limit the output current to a predetermined value, (2) means to limit the output power to a predetermined value, and (3) means to make the regulating system insensitive to very rapid non-major fluctuations in output voltage which would otherwise result in excessive power loss and heat production.

In the form here specifically disclosed the regulator system is essentially of the voltage regulating type, but is provided with means sensitive to changes in the applied load even before those changes are reflected in variations in the output voltage, said means being active together with the normal output-voltage-sensing means to control the switching of the regulating transistor, thereby to cause the system to react more rapidly and accurately to anticipate changes in output voltage caused by load changes. This result is accomplished by providing a filter circuit across the output of the regulator on the output side of the choke coil in one of the output lines, sensing the current flowing in the filter circuit, and modifying the control action of the conventional output-voltage-sensing system in accordance therewith.

The regulating transistor is operated in the switching mode between on and off conditions. The particular condition of the switching transistor at any instant is controlled by a transistorized flip-flop circuit, operable in one or the other of its "flip" and "flop" statuses. The signals from the output voltage sensing system and from the system which senses the current in the filter circuit are jointly active on the flip-flop control circuit so as to cause it to shift from one status to another, thereby changing the switching transistor from one condition to another, according to a time schedule such as to maintain the output voltage at a predetermined value.

A condition, usually temporary, sometimes exists where the output current varies within narrow limits at an extremely rapid rate, and if the switching transistor were to shift between its operative conditions at that rate an excessive power loss and an overheating of the switching transistor would result. To take care of this situation a frequency limiting circuit is incorporated into the flip-flop control circuit. It functions on each change in status of the flip-flop circuit to prevent, for a limited period of time corresponding to the desired maximum flip-flop frequency, the status of the flip-flop circuit from changing unless a very radical change in output voltage is sensed. In effect this frequency limiting circuit, for the limited period of time when it is operative after a change in status of the flip-flop circuit, requires a greater than normal bias to be applied to the flip-flop circuit in order to cause a subsequent change in status thereof.

Means are provided in the system here disclosed for sensing the output current. This means performs a double function. In and of itself it provides an overriding control effective to limit the output current so that it does not exceed a predetermined value irrespective of the output voltage. In addition, the current-sensing signal is combined with a voltage-sensing signal to produce a signal which is a measure of the output power, and that output power signal provides an overriding control preventing the output power from exceeding a predetermined value irrespective of the output voltage. Thus both current and power-limiting functions result.

The use of a flip-flop circuit, preferably transistorized, to control the condition of the switching transistor is highly effective in causing the switching transistor to shift rapidly between its on and off conditions, thereby minimizing power loss and heat production. Moreover, the flip-flop control circuit is exceptionally well adapted to be actuated by the simultaneous action of a plurality of control means of the type set forth above.

The entire system is, considering its accuracy and the extreme sophistication of the types of control to which it is subjected, extremely simple and inexpensive.

To the accomplishment of the above, and to such other objects as may hereinafter appear, the present invention relates to the circuit arrangement of a regulator system and the various controls therefor as defined in the appended claims and as described in this specification, taken together with the accompanying drawings, in which:

FIG. 2 is a circuit diagram of a preferred embodiment; and

FIG. 3 is a detailed circuit diagram of that portion of the circuit of FIG. 2 relating to the production of a positive reference voltage supply.

*General description*

Figure 1:
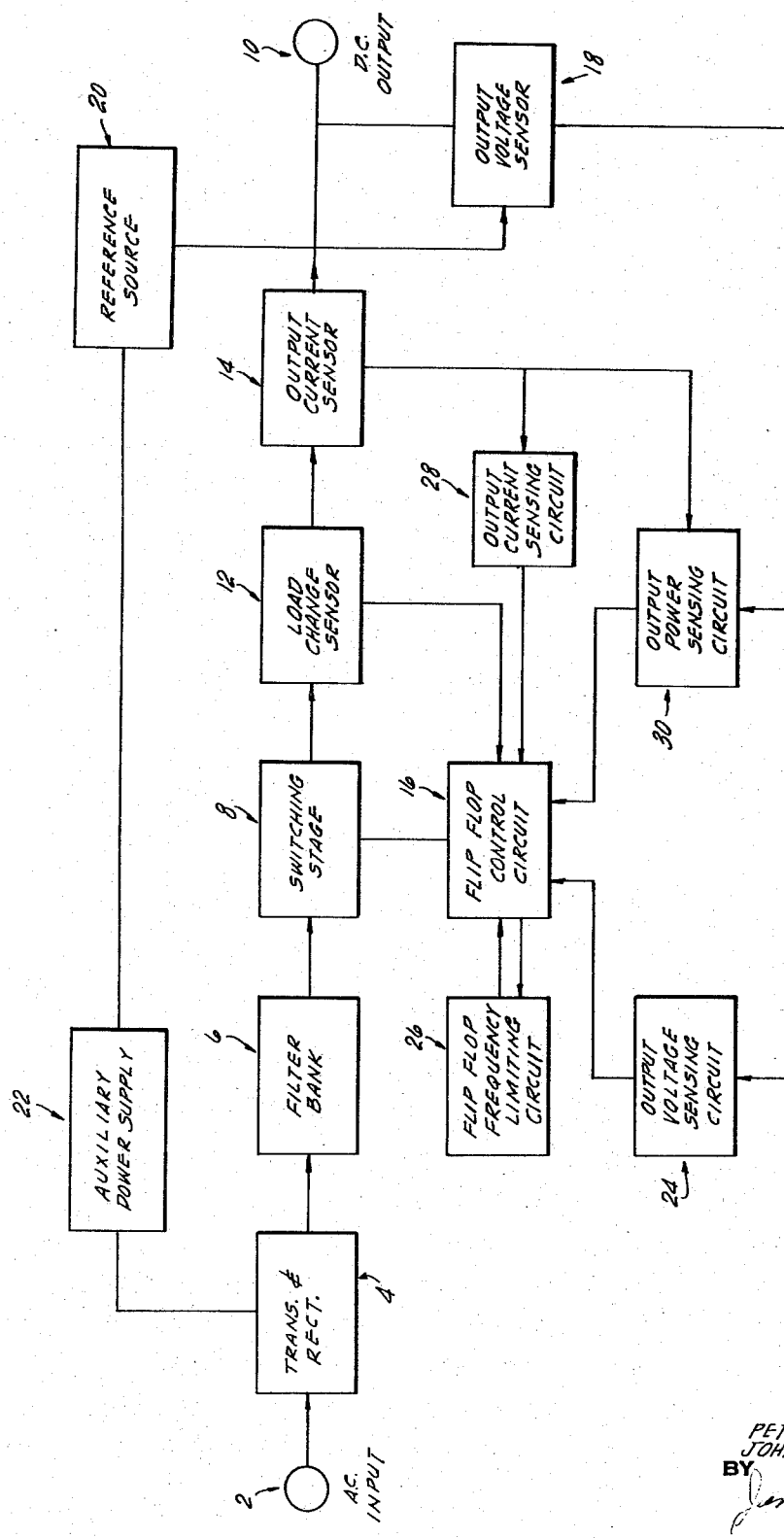
FIG. 1 is a block diagram of the overall system.

Turning first to the block diagram, FIG. 1, which discloses in elemental form the operative sections of the regulator system of the present invention, an AC input generally designated 2 is connected to a transformer and rectifier section 4 the output of which passes through a filter section 6 to a switching stage 8. The output from the switching stage 8 is fed to a DC output 10, and between the switching stage 8 and the DC output 10 is a load change sensor 12 and an output current sensor 14. The switching stage 8 operates either in on-condition or off-condition, and the condition in which it operates at any given instant is controlled by flip-flop control circuit 16. A sensor 18 compares the DC output voltage with a reference voltage derived from reference source 20, the latter being fed from auxiliary power source 22 energized by the transformer portion of the transformer and rectifier section 4. The difference between the sensed portion of the output voltage and the reference voltage is fed to output voltage sensing circuit 24, which produces a signal controlling the action of the flip-flop control circuit 16, thereby to vary the condition of the switching stage 8 so as to maintain the DC output voltage at a predetermined value. A signal from the load change sensor 12 also actuates the flip-flop control circuit 16 so as to render its control action on the switching stage 8 more rapidly and accurately sensitive to load changes, in this action modifying, and coacting with, the actuating signal derived from the output voltage sensing circuit 24. Thus, highly accurate and very rapidly acting voltage regulation is achieved.

A flip-flop frequency limiting circuit 26 is operatively connected to the flip-flop control circuit 16, and functions in the following fashion: For a given status of the flip-flop control circuit 16, a nominal change in bias or signal applied thereto is required in order to effect a change in status thereof. Whenever the status of the flip-flop control circuit 16 changes, the frequency limiting circuit 26 is actuated, and it will, for a limited period of time, so condition the flip-flop control circuit 16 that a signal or bias much higher than nominal will be required in order to change its status. After that limited period of time has passed, the flip-flop control circuit 16 reverts to normal operating conditions where a nominal change in bias will cause a change in its status. As a result very rapid non-major fluctuations in the output current, that is to say, fluctuations of moderate extent which occur within the limited period of time during which the frequency limiting circuit 26 is operative, will not be effective to cause a change in status of the flip-flop control circuit 16, and hence will not be effective to cause a change in the condition of the switching stage 8.

The output current sensor 14 produces a signal which is fed to an output current sensing circuit 28, and when that signal reaches a value corresponding to a predetermined maximum desired value of output current, the output current sensing circuit 28 will provide overriding actuation of the flip-flop control circuit 16 in order to produce a current limiting feature independent of the output voltage. The output power sensing circuit 30 receives signals both from the output current sensor 14 and the output voltage sensor 18 and produces a signal corresponding to output power which, when the output power exceeds a predetermined maximum value, provides overriding actuation of the flip-flop control circuit 16, thereby to control the switching stage 8 so as to prevent the output power from exceeding said predetermined value irrespective of the DC voltage output.

*Switching mode regulation*

An AC input is applied at input terminals 32 and 34 across the primary 36 of a transformer generally designated 38. The transformer has two secondaries, designated 40 and 42. The secondary 42 forms a part of the auxiliary power supply 22, which will be described hereinafter. The secondary winding 40 forms a part of the regulation system per se, and is connected to a full wave rectifier 44 from which two lines 46 and 48 extend to the D.C. output terminals 50 and 52 respectively. As here specifically disclosed the line 46 is maintained at a positive potential relative to the line 48, the output terminals 50 and 52 therefore being designated as "positive" and "negative" terminals respectively.

The switching stage 8 comprises a pair of Darlington-connected transistors 54 and 56 in the line 48. A choke coil 58 is connected in the line 48 in series with and on the output side of the transistors 54 and 56. Resistors 60 and 62 connect the bases of transistors 54 and 56 respectively to the line 48, these resistors being provided to absorb leakage current from the transistors 54 and 56 at high temperatures and to help discharge the bases of those transistors when they shift from on to off condition, thereby making the transistion to off condition more rapid.

The transistors 54 and 56 are designed to be operated in a switching mode between on and off conditions by means to be described hereinafter.

The output from the full wave rectifier 44 is filtered by capacitor 64 defining the filter bank 6. A filter circuit 65 comprising resistor 66 connected in series with capacitor 68 is connected across the lines 46 and 48, this filter circuit being connected to the line 48 at point 70 which is located between the output terminal 52 and the choke coil 58. A rectifier 72 is connected across the lines 46 and 48, joining line 48 at point 74 located between the choke coil 58 and the switching transistors 54, 56.

When the switching transistors 54, 56 are in closed condition a circuit is completed between the full wave rectifier 44 and the output terminals 50, 52 so that current is then supplied to the filter circuit 65 and to the load connected across the output terminals 50, 52. When the switching transistors 54, 56 are in off condition the circuit between the full wave rectifier 44 and the output terminals 50, 52 is broken but the output terminals 50, 52 remain connected to the filter circuit 65 and hence may be supplied with current by the capacitor 68. The relative periods of time during which the switching transistors 54, 56 are on and off respectively will control the amount of current and the voltage available at the output terminals 50, 52. Hence by controlling the condition of the switching transistors 54, 56 in appropriate timed manner the voltage and/or current available at the output teminals 50, 52 can be regulated.

*Flip-flop control circuit 16*

In order to control the condition of the switching transistors 54, 56, and to cause those transistors to shift from one condition to another rapidly and reliably, a flip-flop control circuit 16 is utilized. It comprises transistors 76 and 78, connected together in flip-flop relation and acting upon transistor 80, the latter being connected to the switching transistors 54, 56 via transistor 82. The collector of transistor 76 is connected, by leads 84 and 86, to the base of transistor 78, and is also connected by lead 84 and resistor 88 to the collector of transistor 80, the emitter of transistor 80 being connected by lead 100 to the line 48. The emitter of transistor 76 is connected by lead 102 and resistor 104 to the emitter of transistor 78. The collector of transistor 78 is connected by lead 106 to the base of transistor 80. The emitter of transistor 76 is connected by lead 102, resistor 108 and lead 110 to point 112 located between the resistor 66 and the capacitor 68 in the filter circuit 65, the resistor 66 connecting point 112 to line 46. The collector of transistor 80 is connected by lead 114 to the base of transistor 82. The emitter of transistor 82 is connected by lead 116 to the base of switching transistor 54. The collector of transistor 82 is connected by lead 118 to the collectors of transistors 54 and 56. A resistor 120 is connected between the base and emitter of transistor 80 to absorb the leakage current of that transistor at high temperature and to help discharge the base of that transistor when it shifts from on to off condition, thereby making that shift more rapid. Resistor 99 is connected by leads 142 and 145 between the base of transistor 76 and the positive line 46 in order to absorb leakage current at high temperatures.

The operation of the flip-flop control circuit 16 is determined by the biases applied to the base of transistor 76 and to the emitters of the transistors 76 and 78. In one status of the flip-flop circuit emitter-collector current will flow only through transistor 76; in the other status of that flip-flop circuit emitter-collector current will flow only through the transistor 78. When emitter-collector current flows only through the transistor 78 the transistor 80 will be saturated and will thus bypass to line 48 the base current for transistor 82. Hence transistor 82 will be rendered non-conductive and transistors 54 and 56 will be rendered non-conductive, the switching stage 8 thus being placed in "off" or open-circuit condition. When emitter-collector current flows through transistor 76, transistors 78 and 80 will be non-conductive, base current will be provided to transistor 82, and it and switching transistors 54 and 56 will be rendered conductive with regard to their emitter-collector circuit, thus placing the switching stage 8 in its "on" or closed circuit condition.

The bias on the base of transistor 76 is produced, as will be explained hereinafter, by sensing the voltage, current and power conditions at the output terminals 50, 52. The emitter bias for the flip-flop circuit is derived from the voltage at line 46, as modified by the current flowing through the resistor 66 and causing a voltage drop therein. When the bias conditions are such that the transistor 76 is conductive, (the transistor 78 then being rendered non-conductive) thus placing the switching stage 8 in its "on" condition, the flow of current in the circuit will, after a time, cause the relative biases on the emitter and base of transistor 76 to be changed sufficiently to turn that transistor off. The cessation of the collector-emitter current of the transistor 76 will return the base of transistor 78 to its original bias which existed before the transistor 76 became conductive, and this will cause the transistor 78 to turn on, thereby, in the manner described above, turning the switching stage 8 "off."

*Output voltage sensing system 18, 24*

Since the system here specifically disclosed is designed to function primarily as a voltage regulator, maintaining the voltage at the output terminals 50, 52 at some predetermined value, the main actuation for the flip-flop control circuit 16 is derived from the output voltage sensor 18 and the output voltage sensing circuit 24. This actuation is accomplished by comparing a predetermined portion of the output voltage with an accurately maintained reference suorce 20.

The reference source 20 is derived from the auxiliary power supply 22, which is energized by the scondary winding 42 of the transformer 38. The winding 42 is of the center-tapped type, with the center-tapped line 122 constituting the positive output therefrom and with the end lines 124 and 126 being connected via rectifiers 128 and 130 respectively to line 132 constituting the negative output, capacitor 134 being connected across lines 122 and 132 for filtering purposes. Line 132 is connected to the collector of transistor 136. The emitter of that transistor is connected via resistor 138 and leads 140 and 142 to one end of Zener diode 144, the other end of that diode being connected by lead 146 to the positive line 122 of the auxiliary power suapply 122. The leads 140 and 142 are connected by line 145 to the positive output terminal 50. Thus line 122 is maintained at a predetermined potential difference relative to the positive output terminal 50. The base of transistor 136 is connected by a lead 148 to point 150, which is in turn connected by lead 152 to one side of Zener diode 154, the other side of that diode being connected by lead 156 and oppositely poled rectifier 158 and lead 160 to the positive output terminal 50. Resistor 115 is connected between lines 114 and 152 for voltage reference purposes. The energization of transistor 136 is such that it provides constant current for the Zener diode 144. Connected between line 122 and the negative output terminal 52 are resistor 162 and adjustable resistors 164 and 166. The voltage at point 168 between the resistors 162 and 164 will therefore represent a predetermined portion of the output voltage across output terminals 50, 52, the actual value thereof for a given output voltage value being determined by the setting of the resistors 164 and 166. Thus the resistors 164, 166 constitute the output voltage sensor 18. Point 168 is connected by resistor 170 and lead 172 to the base of transistor 174. The emitter of transistor 174 is connected by resistor 176 to line 122. As has been indicated, the Zener diode 144 maintains line 122 at a predetermined potential relative to output terminal 50, and thus constitutes the reference source 20 the bias of which is applied to the emitter of transistor 174. The base of that transistor is biased by the voltage at point 168, which will vary with the output voltage. Thus the base-emitter bias applied to transistor 174 will be determined by the relation between the output voltage (which controls the potential at point 168) and the reference voltage on line 122. Resistor 177 and rectifier 179 connect the emitter of resistor 174 to the line 140. They, together with resistor 176, are used to compensate for the base-emitter voltage of transistor 174. Rectifier 139, connected between lines 140 and 172, protects transistor 174 against reverse base-to-emitter voltage.

The collector of transistor 174 is connected by lead 178 and resistor 180 to line 152, the collector-emitter current through transistor 174 thus causing the voltage at point 182 to vary. Point 182 is connected by lead 184, forwardly poled rectifier 186, and reversely poled rectifier 188, to the base of flip-flop transistor 76. Hence the bias on the base of transistor 76 will be controlled in accordance with the output voltage across the output terminals 50, 52. The function of the rectifier 188 is to obtain an additional voltage drop so as to properly bias the base of transistor 76.

As the output voltage goes up (as the negative voltage at output terminal 52 becomes more negative) the current through the base of transistor 174 increases, and hence its emitter-collector current increases. This current passes through resistor 180, and the greater the current the more positive is the potential of point 182, and hence the bias applied to the base of flip-flop transistor 76. This tends to turn transistor 76 off. When transistor 76 turns off, transistor 78 turns on, and that, through transistors 80 and 82, switches the switching transistors 54 and 56 off. When the switching stage 8 is thus off, the output voltage will tend to go down.

Capacitor 215 connected between point 182 and line 172 improves the stability of the control loop circuit for output voltage control.

*Load change sensor*

If the flip-flop control circuit 16 is shifted from one status to another solely in accordance with the sensed output voltage the reaction of the system will be somewhat sluggish, particularly in compensating for load changes. It is to eliminate this drawback, and thus improve the accuracy and speed of response of the system, that the load change sensor 12 is employed, that being constituted by the resistor 66 forming a part of the filter circuit 65. As has been explained previously, the point 112 between resistor 66 and capacitor 68 is connected by lead 110 to the emitters of transistors 76 and 78 via resistor 108.

The action of the load change sensor 12 can be understod by considering what takes place in the filter circuit 65. When the switching stage 8 is in on condition current is supplied to the load from the full wave rectifier 44 and this causes a charging of the capacitor 68. The charging current flows through the resistor 66, a voltage drop is produced across that resistor, and the voltage at point 112 will differ from the voltage at line 46 by that voltage drop. When the switching stage 8 is off current is supplied to the load from the capacitor 68, that current flowing in the opposite direction through resistor 66, producing a voltage drop therein in the opposite sense and causing the voltage at point 112 to differ from the voltage at line 46 in the opposite sense. These variations in voltage at the point 112 will be transmitted as variations in bias to the emitters of the flip-flop transistors 76 and 78, thereby, under normal operation, acting in conjunction with the bias on the base of resistor 76 to control the status of the flip-flop control circuit 16.

If there should be a rapid increase in load the current necessary to supply that load will, virtually instantaneously, be supplied by the capacitor 68. This, too, will cause a current flow through the resistor 66, and this current flow will be in the same direction as though the output voltage had decreased. This will therefore cause the flip-flop control circuit 16 to turn the switching stage 8 on sooner than would otherwise have been the case, thus providing energy to the load very promptly in response to the change in load status. Converse operation occurs when the load decreases.

The value of resistor 108 will determine the spacing between the base-emitter biases applied to the flip-flop transistors 76, 78 which are required to cause the flip-flop control circuit 16 to shift from one status to another. Whether flip-flop transistor 76 is conductive or non-conductive is determined by the relation between the bias applied to its base and that applied to its emitter. The bias applied to its base is determined, insofar as thus far described, by transistor 176 in accordance with the sensed output voltage. The bias applied to the emitter of transistor 76 is controlled by the values of resistors 108 and 66 and the magnitude and direction of the current flowing through resistor 66. Hence the timing of the flip-flop control circuit 16 in shifting from one status to another, and consequently the shifting of the switching stage 8 between on and off conditions, is controlled normally by both the sensed output voltage and the magnitude and direction of the sensed current in the load change sensor 12 defined by the resistor 66 forming a part of the filter circuit 65.

*Output current limiting system 14, 28*

Resistor 190 is connected in series in the positive output line 46 immediately before the positive output terminal 50. Resistors 192 and 194 are connected between positive output terminal 50 and negative reference potential line 152. Resistor 192 is adjustable and resistor 194 functions as a potentiometer, having a slidable tap 196 thereon, that tap being connected by lead 198, rectifier 200 and resistor 202 to the base of transistor 204, that base being also connected to the positive output terminal 50 via resistor 214, rectifier 158 and lead 160. It is also connected to negative reference potential line 152 via Zener diode 154. The emitter of transistor 204 is connected by resistor 206 and lead 208 to the positive output line 46 on the input side of resistor 190. The collector of transistor 204 is connected by lead 210 and resistor 212 to line 152, point 211 between lead 210 and resistor 212 being connected to line 184 which goes to the base of flip-flop transistor 76.

Thus the emitter of transistor 204 is biased by the voltage on output line 46 in advance of the resistor 190. The bias applied to the base of transistor 204 is determined by the voltage at positive output terminal 50 (which will differ from the voltage on line 46 by the voltage drop through resistor 190, which will in turn be a function of the output current) as modified by the voltage sensed by the contact 196 on resistor 194 (which is a function of the reference voltage produced by Zener diode 154). Hence the collector-emitter bias on transistor 204 will be a function of the output current. The resistor 190 thus functions as the output current sensor 14, and the transistor 204 functions as the output current sensing circuit 28.

The emitter-collector circuit of transistor 204 is in parallel with the emitter-collector circuit of transistor 174, the latter feeding resistor 180 and, through rectifier 186, also feeding resistor 212. The current through resistor 212 will be constant. When the collector-emitter bias on transistor 204 becomes sufficiently great, as will be the case when the output current of the system reaches a predetermined maximum as selected by the settings of resistors 192 and 194, the collector-emitter circuit of transistor 204 will supply all of the current needs of resistor 212. At this point the transistor 174, constituting a part of the output voltage sensing circuit 24, will no longer supply any portion of its collector-emitter current through rectifier 186. It will, in effect, be disconnected from the base of flip-flop transistor 76, and transistor 204 will take over control of the transistor 76, thus actuating the flip-flop control circuit 16 in order to prevent the output current from exceeding the predetermined maximum value irrespective of the output voltage as sensed by the transistor 174. As a result current limiting is produced.

Capacitor 213, connected between the lower end of resistor 202 and the upper end of resistor 212, improves the stability of the control loop circuit for current limiting control.

*Output power limiting system 14, 18, 30*

Resistors 218 and 220 are connected in series between point 222 on line 146 and point 224 connected to the negative output terminal 52. Point 226, located between resistors 218 and 220, is connected by lead 228 and rectifier 230 to the lower end of resistor 202. Since point 222 is at the same potential as the positive output lead 122 of the auxiliary power supply 22, and point 224 is at the same potential as the negative output terminal 52, the point 226 will be at a voltage representing a predetermined fraction of the output voltage, the particular fraction being determined by the relative magnitudes of the resistors 218 and 220. (They thus function as an output voltage sensor 18.) This bias potential is applied to the base of transistor 204 along with that bias derived from resistor 190 which reflects the output current. Consequently transistor 204 (which doubles as the output power sensing circuit 30) will not only be rendered conductive to a sufficient degree when the output current exceeds a predetermined value, as described in the preceding section, but will also be rendered appropriately conductive when the output power (a function both of voltage and current) exceeds a predetermined value, and when it is thus rendered appropriately conductive it will, in the manner described in the preceding section, take over actuation of the flip-flop control circuit 16 from the output voltage sensing transistor 174. Hence power limiting as well as current limiting is achieved. Resistor 201 is connected between lines 228 and 140 for output power calibration purposes.

*Flip-flop frequency limiting system 26*

Power loss, and hence heat production, in the switching transistors 54, 56 only occurs to any appreciable degree during the time that those transistors shift from on to off or vice versa. The system will be designed to operate satisfactorily, without excessive heat production, at a certain maximum optimum switching frequency, which, for example, may be 2 kilocycles per second. If the output characteristics change more rapidly than this optimum frequency, power dissipation and heat production greater than desired would result if the switching of stage 8 were to be carried out at a correspondingly high frequency. In most instances extremely rapid fluctuations in output conditions, say at 10 kilocycles per second, can be tolerated in the output without regulation provided that those variations are non-major, that is to say, relatively small in magnitude. Accordingly means 26 are provided to prevent the flip-flop control circuit 16 from changing its status in response to such non-major very rapid variations in output conditions.

To that end resistor 232 is connected between the emitter of transistor 76 and point 234 located between resistors 108 and 104, and capacitor 236 and resistor 238 are connected in series between points 240 and 242, point 240 being located between resistor 232 and the emitter of transistor 76 and point 242 being located between resistor 104 and the emitter of transistor 78. Rectifier 239, connected between the base of transistor 78 and line 152, serves to limit the base current for transistor 78. The network defined by elements 236 and 238 is therefore connected in parallel with resistors 104 and 232. When the flip-flop circuit 26 changes its status so that transistor 78 becomes conductive, current flows through resistor 104 and also through the network defined by resistor 232, capacitor 236 and resistor 238, this latter current decaying as capacitor 236 becomes charged.

This current through capacitor 236, while it flows and to the extent that it flows, adds bias to the emitter of transistor 78 and thus makes necessary a greater than nominal bias on the base of transistor 76 in order to cause the flip-flop circuit 16 to again shift its status to render transistor 76 conductive and transistor 78 non-conductive. This means that while the current flowing through capacitor 236 continues, an output voltage sensing bias which normally would cause the flip-flop circuit 16 to change its status would not be effective; only a much greater bias will accomplish that result. The time constant of the circuits 232, 236, 238, as determined by the parameters of the circuit components, is selected so as to be less than the normally acceptable time constant of the flip-flop circuit 16. Hence rapidly fluctuating outptu voltage or the like will have little or no effect on the operation of the overall system unless there is a very major change in the sensed output conditions sufficient to provide a bias capable of overriding the frequency-limiting effect of the networks 232, 236, 238.

Thus with simple, reliable and comparatively inexpensive circuitry, exceptionally well adapted for use with solid state control devices, a regulating system has been produced which has a substantial power handling capacity, a strikingly high degree of accuracy and speed of response, an outstanding factor of reliability, and a truly surprising versatility and sophistication of control.

While the regulator system is here disclosed as utilizing transistors, it will be apparent that, with conventionally appropriate changes in circuitry, other control instrumentalities of the solid state type or of the electron tube type could be employed. It will be further appreciated that details in the specific circuitry here disclosed could be varied without departing from the spirit of the invention as defined in the following claims.

We claim:

1. A regulator system comprising input terminals, output terminals, and a pair of lines connecting said input terminals and said output terminals respectively, one of said lines comprising a switching transistor and an inductance in series, a filter circuit connected across said lines between said inductance and said output terminals, and control means operatively connected from said filter circuit to said switching transistor and effective to control the switching of said transistor between on and off conditions in accordance with the current in said filter circuit.

2. In the regulator system of claim 1, means for sensing the voltage at said output terminals, and additional control means operatively connected from said voltage sensing means to said switching transistor and effective to control the switching of said transistor between on and off conditions in accordance with the voltage at said output terminals, a transistor comprising a pair of electrodes common to both said control means, said filter circuit and said voltage sensing means being connected respectively to different ones of said electrodes.

3. In the regulator system of claim 1, means for sensing the voltage at said output terminals, and additional control means operatively connected from said voltage sensing means to said switching transistor and effective to control the switching of said transistor between on and off conditions in accordance with the voltage at said output terminals, a transistor comprising an emitter electrode and a base electrode common to both said control means, said filter circuit and said voltage sensing means being connected respectively to said emitter electrode and said base electrode.

4. In the regulator system of claim 1, means for sensing the voltage at said output terminals, and additional control means operatively connected from said voltage sensing means to said switching transistor and effective to control the switching of said transistor between on and off conditions in accordance with the voltage at said output terminals, a pair of control transistors connected to one another in a flip-flop circuit having a nominal flip-flop time constant common to both said control means, said filter circuit and said voltage sensing means being connected respectively to different electrodes of said transistors so as to control the flip-flop action thereof, biasing means connected to electrodes of each control transistor comprising a first resistor and, in parallel therewith, a network comprising a second resistor in series with a capacitor, said network having a time constant much shorter than the nominal time constant of said flip-flop circuit, whereby the minimum signal from said control means needed to alter the status of said flip-flop circuit is increased during the time corresponding to the time constant of said network.

5. In the regulator system of claim 1, means for sensing the voltage at said output terminals, and additional control means operatively connected from said voltage sensing means to said switching transistor and effective to control the switching of said transistor between on and off conditions in accordance with the voltage at said output terminals, a pair of control transistors connected in a flip-flop circuit the status of which is controlled by the bias applied thereto, a predetermined bias normally causing a change in status of said circuit, said filter circuit and said voltage sensing means being connected to said flip-flop circuit so as to supply the bias therefor, and means operatively connected to said flip-flop circuit, sensitive to a change in status of said circuit, and effective upon such change in status to condition said circuit for a limited period of time to require a bias greater than said predetermined bias in order to cause a change in the status thereof.

6. A regulator system comprising input terminals, output terminals, and a pair of lines connecting said input terminals and said output terminals respectively, one of said lines comprising a switching transistor and an inductance in series, control means operatively connected to said switching transistor for switching it between on and off conditions respectively, a filter circuit comprising a resistor and capacitor connected in series across said lines between said inductance and said output terminals, and means operatively connected to said control means and to said resistor and effective to actuate said control means to control switching of said transistor between on and off conditions in accordance with the current flowing through said resistor.

7. The regulator system of claim 6, means for sensing the voltage in said output terminals, and additional actuating means for said control means operatively connected to said control means and to said voltage sensing means and effective to control the switching of said transistor between on and off conditions in accordance with said voltage at said output terminals, in which said control means comprises a transistor comprising a pair of electrodes, said first mentioned and additional actuating means being connected respectively to different ones of said electrodes.

8. The regulator system of claim 6, means for sensing the voltage in said output terminals, and additional actuating means for said control means operatively connected to said control means and to said voltage sensing means and effective to control the switching of said transistor between on and off conditions in accordance with said voltage at said output terminals, in which said control means comprises a transistor comprising an emitter electrode and a base electrode, said first mentioned control means and said additional control means being connected respectively to said emitter electrode and to said base electrode.

9. The regulator system of claim 6, means for sensing the voltage in said output terminals, and additional actuating means for said control means operatively connected to said control means and to said voltage sensing means and effective to control the switching of said transistor between on and off conditions in accordance with said voltage at said output terminals, in which said control means comprises a pair of transistors connected to one another in a flip-flop circuit having a nominal flip-flop time constant, said first mentioned and additional actuating means being connected to electrodes of said transistors so as to control the flip-flop action of said circuit, biasing means connected to electrodes of each transistor comprising a first resistor and, in parallel therewith, a network comprising a second resistor in series with a capacitor, said network having a time constant much shorter than the nominal time constant of said flip-flop circuit, whereby the minimum signal from said actuating means needed to alter the status of said flip-flop circuit is increased during the time corresponding to the time constant of said network.

10. The regulator system of claim 6, means for sensing the voltage in said output terminals, and additional actuating means for said control means operatively connected to said control means and to said voltage sensing means and effective to control the switching of said transistor between on and off conditions in accordance with said voltage at said output terminals, in which said control means comprises a pair of transistors connected in a flip-flop circuit the status of which is controlled by the bias applied thereto, a predetermined bias normally causing a change in status of said circuit, said first mentioned and additional actuating means being operatively connected to said transistors to supply said bias, and means operatively connected to said flip-flop circuit, sensitive to a change in status in said circuit, and effective upon such change in status to condition said circuit, for a limited period of time, to require a bias greater than said predetermined bias to cause a change in status thereof.

11. In a regulator system comprising input terminals, output terminals, a pair of lines connecting said input terminals and output terminals respectively, a switching transistor operatively connected to at least one of said lines, means for sensing an output condition, and control means operatively connected between said sensing means and said switching transistor to control the switching of said transistor between on and off conditions in accordance with the sensed output condition; the improvement which comprises said control means comprising a pair of transistors connected in a flip-flop circuit the status of which is controlled by the bias applied thereto, a predetermined bias normally causing a change in the status of said circuit, said sensing means being operatively connected to said transistors to supply said bias, and means operatively connected to said flip-flop circuit sensitive to a change in status of said circuit and effective upon such change in status to condition said circuit for a limited period of time, to require a bias greater than said predetermined bias to cause a change in the status of said circuit.

12. In a regulator system comprising input terminals, output terminals, and a pair of lines connecting said input terminals and said output terminals respectively, a switching transistor operatively connected to at least one of said lines, means for sensing an output condition, and control means operatively connected between said sensing means and said switching transistor to control the switching of said transistor in accordance with said output condition; the improvement which comprises a pair of transistors connected to one another in a flip-flop circuit, said circuit having a nominal flip-flop time constant, said control means being connected to electrodes of said transistors so as to control the flip-flop action of said circuit, biasing means connected to electrodes of each transistor comprising a first resistor and, in parallel therewith, a network comprising a second resistor in series with a capacitor, said network having a time constant much shorter than the nominal time constant of said flip-flop circuit, whereby the minimum signal from said control means needed to alter the status of said flip-flop circuit is increased during the time corresponding to the time constant of said network.

13. In a regulator system comprising input terminals, output terminals, and first and second lines connecting said input terminals and said output terminals respectively, a switching transistor operatively connected to at least one of said lines, means for sensing an output condition, and control means operatively connected between said sensing means and said switching transistor to control the switching of said transistor in accordance with said output condition; the improvement which comprises said control means comprising first and second resistors and the collector-emitter circuit of a first transistor connected in series from said first line to said second line, the collector-emitter circuit of a second transistor connected from a point between said first and second resistor to a point on said second line, the base of said first transistor being connected to the collector of said second transistor, said sensing means being connected to the base of said second transistor, said transistors being connected in a flip-flop circuit having a nominal flip-flop time constant, and a network connected in parallel with said second resistor and comprising a third resistor in series with a capacitor, said network having a time constant much shorter than the nominal time constant of said flip-flop circuit, whereby the minimum signal from said control means needed to alter the status of said flip-flop circuit is increased during the time corresponding to the time constant of said network.

14. A regulator system comprising input terminals, output terminals, and first and second lines connecting said input terminals and said output terminals respectively, a switching transistor operatively connected to at least one of said lines, means for sensing an output condition, and control means operatively connected between said sensing means and said switching transistor to control the switching of said transistor in accordance with said output condition, said control means comprising first and second resistors and the collector-emitter circuit of a first transistor connected in series from said first line to said second line, the collector-emitter circuit of a second transistor connected from a point between said first and second resistor to a point on said second line, the base of said first transistor being connected to the collector of said second transistor, said sensing means being connected to the base of said second transistor, said transistors being connected in a flip-flop circuit.

15. A regulator system comprising input terminals, output terminals, and first and second lines connecting said input terminals and said output terminals respectively, a switching transistor operatively connected to at least one of said lines, first means for sensing the voltage across said output terminals, second means for sensing the current at said output terminals, control means operatively connected to said switching transistor to control the switching thereof, and actuating means operatively connecting said first and second sensing means to said control means and effective to normally actuate said control means in accordance with the sensing of said first means and to actuate said control means in accordance with the sensing of said second means when the current at said output terminals exceeds a predetermined value, said control means comprising a control transistor having first and second control electrodes, said first sensing means comprising a first sensing transistor having an output circuit including a biasing element connected to said first control electrode of said control transistor via a forwardly poled rectifier, said second sensing means comprising a second sensing transistor having an output circuit including a biasing element connected to said first control electrode of said control transistor, the output circuits of said sensing transistors being in parallel with one another, said first sensing transistor having a control electrode operatively connected to the voltage across said output terminals, said second sensing transistor having a control electrode operatively connected to the current at said output terminals, said switching transistor is connected in one of said lines in series with an inductance, a filter circuit connected across said lines between said inductance and said output terminals, and means operatively connecting said filter circuit and said second control electrode of said control transistor and effective to control the switching of said transistor between on and off conditions in accordance with the current in said filter circuit.

16. The system of claim 15, in which said control means comprises a pair of transistors, one of which is said control transistor, connected to one another in a flip-flop circuit.

17. The system of claim 15, in which said control means comprises a pair of transistors, one of which is said control transistor, connected to one another in a flip-flop circuit, a predetermined bias normally causing a change in status of said flip-flop circuit, said first and second sensing means being operatively connected to said flip-flop circuit to supply said bias, and means operatively connected to said flip-flop circuit sensitive to a change in status of said circuit and effective upon such change in status to condition said circuit, for a limited period of time, to require a bias greater than said predetermined bias to cause a change in status thereof.

18. A regulator system comprising input terminals, output terminals, and first and second lines connecting said input terminals and said output terminals respectively, a switching transistor operatively connected to at least one of said lines, first means for sensing the voltage across said output terminals, second means for sensing the current at said output terminals, control means operatively connected to said switching transistor to control the switching thereof, and acuating means operatively connecting said first and second sensing means to said control means and effective to normally actuate said control means in accordance with the sensing of said first means and to actuate said control means in accordance with the sensing of said second means when the current at said output terminals exceeds a predetermined value, said switching transistor is connected in one of said lines in series with an inductance, a filter circuit connected across said lines between said inductance and said output terminals, and means operatively connecting said filter circuit and said control means and effective to control the switching of said transistor between on and off conditions in accordance with the current of said filter circuit.

19. A regulator system comprising input terminals, output terminals, and first and second lines connecting said input terminals and said output terminals respectively, a switching transistor operatively connected to at least one of said lines, first means for sensing the voltage across said output terminals, second means for sensing the current at said output terminals, control means operatively connected to said switching transistor to control the switching thereof, and acuating means operatively connecting said first and second sensing means to said control means and effective to normally actuate said control means in accordance with the sensing of said first means and to actuate said control means in accordance with the sensing of said second means when the current at said output terminals exceeds a predetermined value, said control means comprises a pair of transistors connected to one another in a flip-flop circuit, a predetermined bias normally causing a change in status of said flip-flop circuit, said first and second sensing means being operatively connected to said flip-flop circuit to supply said bias, and means operatively connected to said flip-flop circuit, sensitive to a change in status of said circuit and effective upon such change in status to condition said circuit, for a limited period of time, to require a bias greater than said predetermined bias to cause a change in status thereof.

20. A regulator system comprising input terminals, output terminals, and a pair of lines connecting said input terminals and said output terminals respectively, a switching transistor operatively connected to at least one of said lines, first means for sensing the voltage across said output terminals, second means for sensing the current at said output terminals, third means for sensing the voltage across said output terminals, control means operatively connected to said switching transistor to control the switching thereof, and actuating means operatively connecting said first, second and third sensing means to said control means and effective (a) to normally actuate said control means in accordance with the sensing of said first means, (b) to actuate said control means in accordance with the sensing of said second means when the current at said output terminals exceeds a predetermined value, and (c) to actuate said control means in accordance with the combined sensing of said second and third means when the power supplied by said output terminals exceeds a predetermined value.

21. The system of claim 20, in which said control means comprises a control transistor having a control electrode, a first sensing transistor forming a part of said first sensing means and having an output circuit including a biasing element connected to said control electrode of said control transistor via a forwardly poled rectifier, a second sensing transistor forming a part of said second and third sensing means and having an output circuit including a biasing element connected to said control electrode of said control transistor, the output circuits of said sensing transistors being in parallel with one another, said first sensing transistor having a control electrode operatively connected to the voltage across said output terminals, said second sensing transistor having a control electrode operatively connected to the current at said output terminal and to the voltage across said output terminals.

22. The system of claim 21, in which said control transistor has first and second control electrodes, said first and second sensing transistors being operatively connected to said first control electrode of said control transistor, said switching transistor is connected in one of said lines in series with an inductance, a filter circuit connected across said lines between said inductance and said output terminals, and means operatively connecting said filter circuit and said second control electrode of said control transistor and effective to control the switching of said transistor between on and off conditions in accordance with the current in said filter circuit.

23. The system of claim 21, in which said control transistor has first and second control electrodes, said first and second sensing transistors being operatively connected to said first control electrode of said control transistor, said switching transistor is connected in one of said lines in series with an inductance, a filter circuit connected across said lines between said inductance and said output terminals, and means operatively connecting said filter circuit and said second control electrode of said control transistor and effective to control the switching of said transistor between said on and off conditions in accordance with the current in said filter circuit, said control means comprising a pair of transistors, one of which is said control transistor, connected to one another in a flip-flop circuit.

24. The system of claim 21, in which said control transistor has first and second control electrodes, said first and second sensing transistors being operatively connected to said first control electrode of said control transistor, said swtiching transistor is connected in one of said lines in series with an inductance, a filter circuit connected across said lines between said inductance and said output terminals, and means operatively connecting said filter circuit and said second control electrode of said control transistor and effective to control the switching of said transistor between said on and off conditions in accordance with the current in said filter circuit, said control means comprising a pair of transistors, one of which is said control transistor, connected to one another in a flip-flop circuit, a predetermined bias normally causing a change in status of said circuit, said first, second and third sensing means being operatively connected to said flip-flop circuit to supply said bias, and means operatively connected to said flip-flop circuit, sensitive to a change in status of said circuit and effective upon such change in staus to condition said circuit, for a limited period of time, to require a bias greater than said predetermined bias to cause a change in status thereof.

25. The system of claim 20, in which said switching transistor is connected in one of said lines in series with an inductance, a filter circuit connected across said lines between said inductance and said output terminals, and means operatively connecting said filter circuit and said control means and effective to control the swtiching of said transistor between on and off conditions in accordance with the current of said filter circuit.

26. The system of claim 20, in which said switching transistor is connected in one of said lines in series with an inductance, a filter circuit connected across said lines between said inductance and said output terminals, and means operatively connecting said filter circuit and said control means and effective to control the switching of said transistor between on and off conditions in accordance with the current of said filter circuit, said control means comprising a pair of transistors connected to one another in a flip-flop circuit.

27. The system of claim 20, in which said switching transistor is connected in one of said lines in series with an inductance, a filter circuit connected across said lines between said inductance and said output terminals, and means operatively connecting said filter circuit and said control means and effective to control the switching of said transistor between on and off conditions in accordance with the current of said filter circuit, said control means comprising a pair of transistors connected to one another in a flip-flop circuit, a predetermined bias normally causing a change in status of said circuit, said first, second and third sensing means being operatively connected to said flip-flop circuit to supply said bias, and means operatively connected to said flip-flop circuit, sensitive to a change in status of said circuit and effective upon such change in status to condition said circuit, for a limited period of time, to require a bias greater than said predetermined bias to cause a change in status thereof.

References Cited

UNITED STATES PATENTS

| | | |
|---|---|---|
| 3,226,630 | 12/1965 | Lampke. |
| 3,284,692 | 11/1966 | Gautherin. |
| 3,286,157 | 11/1966 | Leostic. |
| 3,305,764 | 2/1967 | Todd. |
| 3,305,767 | 2/1967 | Beihl et al. |

JOHN F. COUCH, *Primary Examiner.*

A. D. PELLINEN, *Assistant Examiner.*